United States Patent [19]

Caridi

[11] Patent Number: 4,810,738

[45] Date of Patent: Mar. 7, 1989

[54] COATING COMPOSITION AND METHOD TO INCREASE ELECTROPHORETIC FILM THICKNESS

[75] Inventor: Frank J. Caridi, Olean, N.Y.

[73] Assignee: Dresser Industries, Inc., Dallas, Tex.

[21] Appl. No.: 41,649

[22] Filed: Apr. 21, 1987

Related U.S. Application Data

[63] Continuation of Ser. No. 728,416, Apr. 29, 1985, abandoned.

[51] Int. Cl.$^4$ ............... C08K 5/04; C08K 5/16; C08G 59/16; C08F 265/04
[52] U.S. Cl. ..................... 524/317; 204/181.6; 204/181.7; 252/DIG. 1; 523/300; 523/402; 524/244; 524/318; 524/375; 524/376; 524/457; 524/458
[58] Field of Search .............. 252/355, 356, 357, 160, 252/170, 171, 122; 204/180.2, 181.4; 523/300, 402; 524/244, 317, 318, 375, 376, 457, 458

[56] References Cited

U.S. PATENT DOCUMENTS

| | | | |
|---|---|---|---|
| 4,042,478 | 8/1977 | Hazan | 204/181.4 |
| 4,048,379 | 9/1977 | Jidai | 428/500 |
| 4,487,674 | 12/1984 | Al | 204/181.4 |

*Primary Examiner*—Christopher Henderson

[57] ABSTRACT

An additive composition for electrophoretic baths, an electrophoretic bath, and a process for achieving thicker films by electrophoretic deposition techniques by providing an aqueous solubilized organic resin medium containing additive components in the range of about 1 to 15% by weight of solids in the bath of a compatible surfactant, by 1 to about 15% of a reactive viscosity modifier by weight of solids in the medium, and from about 2 to about 15% of a relatively water immiscible solvent based on the weight of solids in the bath. The additive components may be formulated into a premixed composition of predetermined concentrations of the components and then added to the e-coat bath, or the components may be added to an e-coat bath separately in predetermined amounts. In a preferred embodiment the ratio of surfactant to reactive viscosity modifier to solvent is between 1:0.75:0.75 and 1:5:6.

27 Claims, No Drawings

COATING COMPOSITION AND METHOD TO INCREASE ELECTROPHORETIC FILM THICKNESS

This application is a continuation of application Ser. No. 728,416, filed Apr. 29, 1985, now abandoned.

TECHNICAL FIELD

This invention relates to increasing the film thickness of electrophoretically deposited coatings. More particularly, this invention concerns an additive composition capable of increasing resin deposition applied to conductive substrates by electrocoating techniques.

BACKGROUND OF THE INVENTION

Electrophoretic deposition of organic resins is a known technique for coating conductive substrates. It is a common technique for applying protective coatings to prevent rust and corrosion of metal.

In the electrocoating technique, solubilized resins having a positive or negative electrical charge are placed in an appropriate container usually in the form of an aqueous solution, the resulting mixture is referred to in the art as an "e-coat" bath. An opposite charge to that of the resin is applied to a conductive substrate which is placed in the bath contacting the resin solution. At the point of contact, the charge on the resin is neutralized and the resin precipitates out of solution thereby coating the conductive substrate. The substrate is then removed from the bath, rinsed and subjected to a curing procedure.

Although electrocoating is an effective method to coat conductive materials, there has consistently been a need to increase the thickness of coatings applied by the method. The thickness is limited because the conductive substrate becomes progressively insulated by the film being deposited onto it, thus reducing the attractive forces between charged resin molecules and charged substrate, until no further deposition takes place. In U.S. Pat. No. 4,487,674 assigned to the same assignee now issued as U.S. Pat. No. 4,487,674, hereby incorporated by reference it was disclosed that thicker coatings could be achieved by adding suitable surfactant to the e-coat system in concentration ranges greater than those employed in standard industry practice. While the use of increased surfactant allows increased film thickness, it was found that increased surfactant concentration was not a total solution for achieving thicker film because the resulting films had certain deficiencies such as softness, pinholes, etc.

Coating quality is as important as thickness because both factors affect the degree of protection afforded to the substrate by the coating. Thus, it is desirable that increased thickness be achieved together with good film quality. Characteristics considered in evaluating film quality include appearance, adhesion, hardness and solvent resistance. It has now been found that film coatings of increased thickness that retain high quality can be achieved with addition of a new additive mixture to the e-coat system. The new additive includes a surfactant in higher concentration than employed in standard industry practice, a reactive viscosity modifier, and a solvent. The new additive mixture has been shown to enable e-coat procedures to deposit up to double the thickness previously achievable, while still allowing deposited coating to possess the desired characteristics of good appearance, adhesion, hardness, and solvent resistance.

SUMMARY OF THE INVENTION

In one aspect the present invention relates to an additive composition for use in electrophoretic deposition techniques comprising an admixture of from 3 to 83% of surfactant, 3 to 83% of a reactive viscosity modifier and 6 to 88% of solvent. As used herein all percentage are by weight. In the preferred embodiment of the admixture of from about 14 to about 72 percent of a surfactant, from about 14 to about 72 percent of a reactive viscosity modifier and from about 14 to about 72 percent by weight of a solvent. In the most preferred embodiment the composition of the additive composition is from about 8 to 40 percent surfactant, 22 to 62 percent reactive viscosity modifier and from 22 to 62 percent solvent. Furthermore, it is preferred that the ratio of surfactant: reactive viscosity modifier: solvent be between 1:0.75:0.75 and 1:5:6. In the preferred embodiment the surfactant is a nonionic surfactant which may be capable of cross-linking with the reactive viscosity modifier, the solvent preferably is a water immiscible solvent with a low dielectric constant, and the reactive viscosity modifier is an ethylenically unsaturated ester curable by autooxidation. The reactive viscosity modifier can be one which cross-links with either itself, the resin, the surfactant or combination of these. Most preferrably the surfactant is a nonionic surfactant capable of cross-linking with the reactive viscosity modifier. In use the additive is added to an "e-coat" bath, in an amount above about 5 percent by weight based on the weight of solids in the bath and preferably above about 10 percent to achieve increased film thickness, and more preferably in an amount above about 15 percent by weight based on the weight of solids.

In another aspect the present invention relates to the "e-coat" bath composition incorporating the components of the additive composition. The improved "e-coat" bath of the present invention contains from about 75 to about 95 percent volatiles, from about 5 to about 25 percent by weight of solids, and additives. As used herein "solids" refer to the weight of resin or the combination of resin and pigment suspended in the "e-coat" bath. The components of the additives added to the e-coat bath are in amounts based on the weight of solids in the bath, and the amount of each is expressed in terms of weight percent by weight of solids. As used herein "% BWS" means weight percent by weight of solids, e.g. an e-coat bath with 80 grams of resin and 20 grams of pigment would have 100 grams of solids and the addition of 10 grams of solvent would be 10% BWS of solvent. The "e-coat" bath of the present invention contains from about 1.0 to about 15% BWS of surfactant, from about 1.0 to about 15% BWS of reactive viscosity modifier, and from about 2.0 to about 15% BWS of solvent. In a more desired embodiment the bath composition includes from 2.0 to about 11.0% BWS of surfactant, from about 2.0 to about 11% BWS of reactive viscosity modifier, and from about 2.0 to about 11% BWS of solvent. And in the most preferred embodiment the bath composition contains from about 2.0 to about 8.5% BWS of surfactant, from about 3.5 to about 10% BWS of reactive viscosity modifier, and from about 3.5 to about 10% BWS of solvent. Furthermore, it is preferred when the components added to the bath be in a ratio of surfactant:reactive viscosity modifier:solvent be between 1:0.75:0.75 to 1:5:6.

It is preferred in the present invention that the surfactant be added in an amount 40% or less of the total additive components, whether or not the components are added separately or added as a premixed additive composition. More preferably the surfactant accounts for less than about 33.3% of the total additive component addition. In general, it is desirable to use the least amount of surfactant necessary to achieve dispersion of the other additive components in the bath.

In another aspect the invention relates to alternate embodiments in which the additive components are premixed with the resin, or the pigment, or a resin-pigment combination, prior to dilution to form the e-coat bath.

DETAILED DESCRIPTION

The present invention relates to components to be added to paint compositions and in particular to electrophoretic paint compositions and electrophoretic baths to achieve increased film thickness while maintaining acceptable film quality. These components may be added to the bath separately; or they may be added to the pigment, resin, or pigment and resin prior to dilution with water to form a bath; or the components may be admixed to form an additive mixture which then can be added to any of the above to achieve acceptable film quality with good thickness.

The additive components of the present invention are a surfactant, a reactive viscosity modifier, and a solvent.

In one aspect the invention relates to a premixed additive admixture to be incorporated with a paint, particularly an electrophoretic coating composition and baths to achieve increased film thickness while achieving films exhibiting acceptable quality properties of appearance, adhesion and hardness. The premixed additive admixture composition is as follows:

| Ingredients | Acceptable Range wt % | Preferred Range, wt % | Most Preferred Range wt % |
| --- | --- | --- | --- |
| surfactant | 3–83 | 14–72 | 8–40 |
| reactive viscosity modifier | 3–83 | 14–72 | 22–62 |
| solvent | 3–88 | 14–72 | 22–62 |

It is also preferred that the ratios of surfactant:reactive viscosity modifier:solvent be between about 1:0.75:0.75 and about 1:5:6. The order of the mixing of the components is not critical; however, in normal practice the reactive viscosity modifier and solvent are added to the surfactant. The characteristics of the components are addressed in greater detail below.

Another aspect of the present invention relates to the formation of an "e-coat" bath containing the additives. As is known, in any ordinary "e-coat" bath there is an aqueous dispersion of a paint, which is usually a mixture of resin and pigment but occasionally resin only. "Solids" as used herein refer to the amount of resin, or combination of pigment and resin in the "e-coat" bath. The "e-coat" bath contains water, resin, solvent, reactive viscosity modifier, and surfactant, and may optionally include pigment, accelerators, etc. The ranges of water, pigment, and resin suitable for use in the present invention are any of those ranges known in the art. An "e-coat" bath in accordance with the present invention is formed by utilizing water, pigment, and resin as known in the art together with the additives of the present invention in the following ranges:

| Ingredients | Preferable Range wt % BWS | Preferred Range wt % BWS | Most Preferred Range wt % BWS |
| --- | --- | --- | --- |
| surfactant | 1–15 | 2–10 | 2.0–8.5 |
| reactive viscosity modifier | 1–15 | 2–10 | 3.5–10 |
| solvent | 2–15 | 2–10 | 3.5–10 |

It is also preferred that the ratio of surfactant:reactive viscosity modifier:solvent be between 1:0.75:0.75 and 1:5:6.

The "e-coat" bath can be made by forming a bath of water, resin or resin and pigment and adding the components in the desired ranges separately or in combination. If the components are added separately it is important to first admix the surfactant into the bath otherwise the reactive viscosity modifier may not be adequately dispersed or dissolved within the bath. After the surfactant is added the order of addition of reactive viscosity modifier and solvent is not critical. The additives can also be incorporated by admixing a sufficient amount of the additives in the form of the premixed additive admixture. After the additives have been incorporated in the bath it is desirable to agitate the bath for a sufficient period of time to achieve a homogeneous admixture.

The additives may also be incorporated into the resin, pigment or pigment-resin combination before those components are diluted with water to form the e-coat bath. Again if such premixing is utilized the order of addition is not particularly important except that the surfactant should be incorporated first.

It will be recognized by those skilled in the art that resin frequently is sold in a concentrated form with the resin dispersed in water. The additives can be combined into such products as described above prior to the further dilution of the resin to form an electrophoretic bath.

It is desirable to add sufficient surfactant in order to adequently disperse or dissolve the additive components within the bath. A slight excess of surfactant beyond that necessary to achieve dispersion of the components is desired. In the preferred embodiments the surfactant concentration is abolut 40% or less of the total additive components, whether the additive components are placed in a bath separately or are placed in the bath as a premix additive composition. In the more preferred embodiments, surfactant is utilized in the concentration of about 33.3% or less of the total additive components added to the bath period, whether added separately or a premixture.

The characteristics of the solvent, surfactant and reactive viscosity modifier are discussed in greater detail below. A great variety of possible surfactants, solvents, and reactive viscosity modifiers are suitable for use in the present invention. It is important that each component be compatible with the resin, pigment or resin pigment combination used in the bath. Compatibility with the bath is defined as the absence of significant resin agglomeration or gelation, foam, or scum upon the addition of the components added to the bath, which render the e-coat bath unsatisfactory within several hours of operation.

A. Surfactants

The surfactants of the present invention are noinionic surfactants that are compatible with the e-coat bath and are preferrably cross-linkable with the reactive viscosity modifier by auto-oxidation. It is not necessary that the surfactant be cross-linked with the reactive viscosity modifier. In certain cases it is expected that amphoteric, cationic and anionic can function equivalently to nonionic surfactants. In appropriate circumstances as demonstrated U.S. Pat. No. 4,487,674, assigned to the same assignee, amphoteric cationic, anionic surfactants can be useful with particular resins.

Lipophilic nonionic surfactants have been found to be most preferred. A guide in choosing a surfactant is the hydrophile lipophile balance (HLB) number of the surfactant. The higher the HLB number, the greater the solubility of the surfactant in water. Surfactants used in the present invention are nonionic and have HLB values ranging from 1.8 to 19.9. The most desirable surfactants used in the present invention have an HLB below 14. Nonionic surfactants in the HLB range of 6 to 14 have been found preferred, while those with HLB's between 6 and 12 have been found particularly preferred. Some nonionic surfactants with higher HLB values than 14 can be useful. While applicant does not wish to be bound by any particular theory, the surfactants with low HLB numbers may better associate with the resin thus allowing deposition to better proceed. The surfactant is associated with the deposited resin during the coating process. In the past surfactants were used in minimal amounts because they weakened the film, as a result of the hydrophilic portions of the surfactant attracting water which softened the film. The surfactants used in the present invention are preferably capable of cross-linking by auto-oxidation to the reactive viscosity modifier, for example, esters of unsaturated fatty acids from linseed oil. This minimizes the effect of increased surfactant.

The concentration of the surfactant is kept in the ranges set forth above. Sufficient surfactant is required to achieve the desired resin—surfactant interaction in aqueous solution, however, the surfactant concentration should normally be kept in the lower portion of the range as shown by the preferred ratio of components, because excessive surfactant may cause poor coating characteristics such as rupture or softness.

The surfactant used should be free of impurities, for example, salts. In addition the surfactant should be free of solvents unless the solvents have the characteristics described below.

The surfactants which have been found useful fall into the following four classes and in general are derivative of ethylene oxide:
1. Amide Ethers
2. Amine Ethers
3. Esters
4. Ethers

1. Amide Ethers

Amide ether surfactants which are ethoxylated aliphatic amides with HLB values ranging from 10 to 19.9 can be used. Typically they are polyethylene oxide derivatives of amides prepared from saturated and unsaturated fatty acids. Commercially available materials can be obtained from Armak under the tradename Ethomid. Examples of nonionic surfactants are: Ethomid HT/23, a polyoxyethylene (12.5) (hydrogenated tallow) amide with an HLB of 13.5; Ethomid HT/60, a polyoxyethylene (50) (hydrogenated tallow) amide with an HLB of 19.0; Ethomid 0/15, a polyoxyethylene (5) oleamide with an HLB of 14.

2. Amine Ethers

Amine ether surfactants which are ethoxylated aliphatic amines with HLB values ranging from 1.8 to 19.9 can be used. They typically are polyethylene oxide derivatives of amines and diamines prepared from saturated and unsaturated fatty acids. They are commercially available from Armak under the tradenames Ethomeen and Ethoduomeen. Many of these amine ethers are cationic surfactants and examples are: Ethomeen C/20, a polyoxyethylene (10) cocoamine with an HLB of 19.2; Ethomeen 18/60, a polyoxyethylene (50) octadecylamine with an HLB of 19.7. Ethomeen T/25, a polyoxyethylene (15) tallowmine with an HLB of 19.3; Ethomeen S/25, a polyoxyethylene (15) soyamine with an HLB of 19.0; Ethoduomeen T/25, N,N$^1$, N$^1$-polyoxyethylene (15)-N-tallow-1,3-propanediamine with an HLB of 18.5.

3. Esters

Ester surfactants which are ethoxylated aliphatic esters with HLB values ranging from 1.8 to 19.9 can be used. They typically are polyoxyethylene derivatives of saturated and unsaturated fatty acids. They are prepared by esterification of acids such as the following with polyethylene glycols and methoxy polyethylene glycols. The acids are normally mixtures of two or more acids as they are usually derived.

Typical Carboxylic Acids (a) Butyric Acid
(b) Caproic Acid
(c) Caprylic Acid
(d) Capric Acid
(e) Lauric Acid
(f) Myristic Acid
(g) Palmitic Acid
(h) Stearic Acid
(i) Palmitoleic Acid
(j) Oleic Acid
(k) Linoleic Acid
(l) Linolenic Acid
(m) Elosteric Acid
(n) Ricinoleic Acid
(o) Cetoleic Acid
(p) Erucic Acid From natural materials such as animal fats, vegetable oils, and marine oils. For example, tallow, linseed oil, and cod liver oil each contain five or more of the above listed acids.

The polyethylene glycols and methoxy polyethylene glycols utilized in preparing the ester surfactants are listed below. They are commercially available from Union Carbide. Typical polyethylene glycols and methoxy polyethylene glycols are listed below with the number indicating the average molecular weight:
(a) Polyethylene Glycol 200
(b) Polyethylene Glycol 300
(c) Polyethylene Glycol 400
(d) Polyethylene Glycol 600
(e) Polyethylene Glycol 1000
(f) Polyethylene Glycol 3350
(g) Polyethylene Glycol 4600
(h) Polyethylene Glycol 8000

(i) Methoxy Polyethylene Glycol 350
(j) Methoxy Polyethylene Glycol 550
(k) Methoxy Polyethylene Glycol 750
(l) Methoxy Polyethylene Glycol 2000
(m) Methoxy Polyethylene Glycol 5000

Ester surfactants prepared from the above acids and polyethylene glycols arfe commercially available from a number of suppliers, for example, Armak, ICI America, and Drew Chemical Co. to name but a few. Examples of nonionic surfactants are: Ethofat 60/25, a polyoxyethylene (15) glycol stearate with an HLB value of 14.2; Ethofat 242/25, a polyethylene (15) glycol tallate with an HLB value of 12.2—both of these materials are available from Armak; Byktone, a nonionic surfactant based on an unsaturated fatty acid ester of unknown HLB value and available from Byk-Mallinckrodt Chemical Co.

In addition to the above ester surfactants, which are derived directly from the fatty acids and polyethylene glycols listed above, there are also esters which are prepared by ethoxylation of glycerol, sorbitol, sorbitan, and mannitan fatty acid esters. Several of these materials are commercially available from ICI America, Inc. Examples of nonionic surfactants are: Tween 20, a polyoxyethylenated sorbitan monolaurate (20 moles of ethylene oxide) with an HLB value of 17; Tween 80, a polyoxyethylenated sorbitan mono-oleate (20 moles of ethylene oxide) with an HLB value of 15.

4. Ethers

Ether surfactants which are ethoxylated aliphatic and aromatic ethers with HLB values ranging from 1.8 to 19.9 can be used. The ethers are prepared by ethoxylation of various aliphatic alcohols and phenols with ethylene oxide. Typical alcohols and phenols are listed below. The alcohols are normally $C_8$ to $C_{18}$ linear and branched, saturated and unsaturated primary alcohols, however, they can also be prepared from polyoxypropylene glycols of various molecular weights. Typical alcohols and phenols used to prepare ether surfactants are:

(a) Octyl Alcohol
(b) Nonyl Alcohol
(c) Decyl Alcohol
(d) Lauryl Alcohol
(e) Tridecyl Alcohol
(f) Myristyl Alcohol
(g) Cetyl Alcohol
(h) Stearyl Alcohol
(i) Isostearyl Alcohol
(j) Aleyl Alcohol
(k) tert-Octylphenol
(l) Nonylphenol
(m) Dodecylphenol
(n) Polyoxypropylene glycol (several molecular weights ranging from 950 to 3250)

Ether surfactants are commercially available and can be obtained from ICI America Inc., Rohm and Haas Company, GAF Corporation, BASF Wyandotte Chemical Corp., Union Carbide Corp., and other companies. Examples of nonionic surfactants are: Brij 35, a polyoxyethylenated lauryl alcohol (23 moles of ethylene oxide) with an HLB value of 17; Triton X-305, a polyoxyethylenated tert-octylphenol (30 moles of ethylene oxide) with an HLB value of 17, Igepal CO-850, a polyoxyethylenated nonylphenol (20 moles of ethylene oxide) with an HLB value of 16; Pluronic F38, a polyoxypropylene glycol (molecular weight 950) plus 85 moles of ethylene oixide with an HLB value of 16.

B. Solvents

The solvent component of the additive composition is added to improve coating rheology and enhance thickness. The solvents used in the present invention are relatively water immiscible solvents. Water immiscible solvents suitable for the present invention are those with a solubility parameter of from about 6.9 to about 10.0. The solubility parameter is determined by the ASTM D-3132 test procedure entitled Solubility Range of Resin and Polymers. Examples of suitable solvents include xylene with a solubility parameter of 8.9 and mineral spirits with a solubility parameter of 7.1 ethylene glycol mono ethyl ether (solubility parameter 9.9) and ethylene mono glycol butyl ether (solubility parameter 8.9), but other similar solvents would be usable.

It is desirable that the solvent is one which does not generate gases when used in the e-coat bath, for example, chlorinated hydrocarbon solvents are naot desired because in the bath they generate HCL gas. The preferred boiling point of the solvent is between about 200° F. and about 350° F. and preferrably between 200° F. and 300° F. Solvents with boiling points above 350° F. are generally not desired because they require too long to dry. Solvents with boiling points below 200° F. flash off from the film too fast and can rupture the film.

C. Reactive Viscosity Modifier

Like the other components the reactive viscosity modifier must be compatable with the "e-coat" system. Reactive viscosity modifier has been found to have significant effect on the film produced. Reactive viscosity modifiers which are curable by auto-oxidation are acceptable. Preferrably the reactive viscosity modifier is cross-linkable with itself, the surfactant or the resin or combination thereof, and has a high degree of unsaturation.

The reactive viscosity modifiers which may be employed in the compositions of the invention are ethylenically unsaturated esters. They may be prepared essentially from any unsaturated aliphatic, cycloaliphatic or aromatic carboxylic acid or alcohol. Representative examples of ethylenically unsaturated aliphatic esters which have been found useful are allyl acrylate, allyl methacrylate, tetrahydrofurfuryl methacrylate, triethylene glycol dimethacrylate, trimethylolpropane trimethacrylate, trimethylolpropane triacrylate, pentaerythritol tetramethacrylate, glycidyl acrylate, glycidyl methacrylate, isodecyl acrylate, dipentaerythritol monohydroxypenta acrylate, pentaerythritol triacrylate, ethoxylated trimethylolpropane triacrylate, ethoxylated bisphenol A diacrylate, ethoxylated bisphenol A dimethacrylate, 2-phenoxyethyl acrylate, tripropylene glycol diacrylate, 1-3 butylene glycol dimethacrylate, pentaerythritol tetraacrylate, tetrahydrofurfuryl acrylate, tetraethylene glycol diacrylate, polyethylene glycol 200 diacrylate, 2-(2-ethoxyethoxy) ethyl acrylate, 2,2-dimethylpropane 1,3-diacrylate, 1,6-hexanediol dimethacrylate, 1,6-hexanediol diacrylate, ethylene glycol dimethacrylate, cyclohexyl methacrylate, tetraethylene glycol dimethacrylate, polyethylene glycol 200 dimethacrylate, n-hexyl methacrylate, 1,3-butylene glycol diacrylate, 1,4-butanediol diacrylate, diethylene glycol diacrylate, diethylene glycol dimethacrylate, 1,6-hexanediol diacrylate, diallyl phthalate, diallyl isophthalate, diallyl diglycollate, diallyl maleate, diallyl adipate, allyl caproate.

In addition, the ethylenically unsaturated esters may be derived from a fatty acid or alcohol or mixtures of fatty acids or alcohols. These correspond generally to the formulas:

$$CH_3-(CH=CH)_x-(CH_2)_y-\overset{O}{\underset{\|}{C}}-OR_1 \text{ and}$$

$$R_1-\overset{O}{\underset{\|}{C}}-O-(CH_2)_y-(CH=CH)_x-CH_3$$

where x is 1, 2, or 3 and y is 1 to 20. $R_1$ is a hydrogen alkyl, such as methyl, ethyl, propyl, isobutyl, or the like having, for example, up to about 20 carbon atoms; aryl such as phenyl or the like; alkylaryl, such as tolyl, xylyl or the like; or aralkyl, such as benzyl, phenethyl or the like. Representative ethylenically unsaturated fatty acids which were found useful are cetoleic acid, oleosteric acid, erucic acid, linoleic acid, linolenic acid, oleic acid, palmitoleic acid, and ricinoleic acid. Mixtures of fatty acids derived from natural products such as linseed oil, safflower oil, tall oil, or the like may also be used to prepare the ethylenically unsaturated esters of this invention. Representative fatty acid alcohols found useful are linolenyl alcohol, linoleyl alcohol, oleyl alcohol, ricinoleyl alcohol, and the like. Mixtures of fatty acid alcohols derived from natural products such as linseed oil, safflower oil, tall oil, or the like may also be used to prepare the ethylenically unsaturated esters of this invention. It has been found that the shorter the chain length of the ester portion of the reactive viscosity modifier, the more compatible it is. The chain length of the ester portion is preferably less than 8 carbons long, and more preferably less than 4 carbons long.

The criteria utilized in selecting the ethylenically unsaturated esters of this invention are well known to those experienced in the art. In functioning as reactive viscosity modifiers, the ethylenically unsaturated esters must be compatible with and not adversely affect the rheology or physical properties of the base anionic or cationic resin. It is desirable that the viscosity modifier crosslinks in some fashion so as not to reduce the hardness or solvent resistance of the cured film.

In practice of the method of the present invention it is desirable that the bath include pigment. It has been found that the presence of pigment increases the pencil hardness of the film; generally giving a hardness of 5H or better. In contrast, use of the same resin without pigment usually does not yield a pencil hardness greater than about 3H. Furthermore, it has been found that coatings containing pigment are harder to wash off.

The selection of the resin to apply to a substrate is governed by parameters known in the art. For use out of doors, a cationic acrylic resin is desirable because of its resistance to sunlight. For areas not exposed to sunlight a cationic epoxy resin can be desirable.

EXAMPLES

The following examples are presented in order to better facilitate the understanding of the subject invention, however, they are not to be construed as limiting the invention to their details. Parts and percentages in all the examples are by weight unless otherwise specified.

In Examples I through X the percent of solids in the e-coat baths was determined experimentally by placing two samples on aluminum weighing dishes. The weight of each dish was recorded as (B). About 3 to 4 grams of well mixed e-coat bath was placed on the dish and recorded as (A). The sample dish was placed in an oven for two hours at 105° C. (220° F.). The sample dish was placed in the oven so that it would lie flat to insure uniform evaporation. The sample dish was removed from the oven, allowed to cool and the weight recorded as (D). The % of solids was computed as $$\% = \frac{D - B}{A - B} \times 100$$

In Examples I to X the following parameters were used with the various resins identified.

| Resin | Cathode cm$^2$ | Anode cm$^2$ | Voltage | Coating Time Seconds |
|---|---|---|---|---|
| PPG Cathodic Epoxy Resin ZN6EZ506 | 6.15 | 3.05 | 250 | 120 |
| PPG Cathodic Acrylic Resin Powercron Plus 700 | 6.15 | 3.05 | 125 | 90 |
| PPG Anionic Epoxy Resin JF3EZ445 | 3.05 | 6.15 | 100 | 120 |
| Spencer-Kellogg Anionic Polyester Resin KELSO 2080 | 3.05 | 6.15 | 100 | 120 |
| JAPCO Anionic Acrylic Resin W359 | 3.05 | 6.15 | 100 | 120 |

In Examples I through X, the pencil hardness was determined by the method described in the *Paint Testing Manual* STP 500, G. G. Sward, editor, published by the ASTM beginning at p. 283.

EXAMPLE I

A nonionic surfactant with a theoretical HLB value of 12.1 was prepared by heating 278.1 parts of linseed oil fatty acids (Proctor and Gamble's L-310), 400.0 parts of polyethylene glycol 400 (Aldrich Chemical Co.) and 0.50 parts of boric acid anhydride to 210° C. The reactants were maintained under an atmosphere of nitrogen and heated and stirred until the theoretical amount of water was distilled off. The surfactant thus produced had an acid number of 9.5 and an iodine number of 75.

A reactive viscosity modifier, isobutyl ester of linseed oil fatty acids, was prepared by heating 278.1 parts of linseed oil fatty acid (Proctor and Gamble's L-310), 148 parts of isobutyl alcohol, and S0.25 parts of paratoluenesulfonic acid to reflux under an atmosphere of nitrogen. The reactants were heated and stirred until the theoretical amount of water was distilled off. The product ester had an acid number of 1.42 and an iodine number of 148.

A cationic electrophoretic coating composition was prepared by adding 10.0 parts of the above surfactant, 10.0 parts of reactive viscosity modifier, and 10.0 parts of xylene to 334.8 parts of a commercially available cationic epoxy resin (PPG's resin ZN6EZ506). Deionized water, 453.0 parts, was then added to yield a coating composition containing 16.8% solids. The cationic electrodeposition bath of pH 6.3 was electrodeposited upon a steel panel at 75° F. and 250 volts for 120 seconds to yield a smooth film which was cured at 375° F. for 20 minutes. The resultant smooth hard film of 3.3 mil average thickness was not void free.

The e-coat bath formed without the surfactant, viscosity modifier and solvent weighed 787.8 grams. The PPG resin ZN6EZ506 was a diluted resin. The e-coat bath had a composition of 16.8% solids. Based on the weight of solids in the e-coat resin, there was added 8.33% BWS surfactant, 8.33% BWS reactive viscosity modifier, and 8.33% BWS solvent.

EXAMPLE II

A nonionic surfactant with a theoretical HLB value of 8.7 was prepared by heating 278.1 parts of linseed oil fatty acids (Proctor and Gamble's L-310), 200.0 parts of polyethylene glycol 200 (Aldrich Chemical Co.) and 0.50 parts of boric acid anhydride to 200° C. The reactants were maintained under an atmosphere of nitrogen and heated and stirred until the theoretical amount of water was distilled off. The surfactant thus produced had an acid number of 11.4 and an iodine number of 119.

A viscosity modifier, methyl ester of linseed oil fatty acids, was prepared by heating 278.1 parts of linseed oil fatty acids (Proctor and Gamble's L-310), 64.0 parts of methanol, and 0.26 parts of paratoluenesulfonic acid to reflux under an atmosphere of nitrogen. The reactants were heated and stirred until the acid number of the mixture was reduced to 5.06. The excess methanol was removed by distillation to yield the product ester which had an iodine number of 176.

A cationic electrophoretic coating composition was prepared by adding 4.0 parts of the above surfactant, 15.0 parts of the methyl ester of linseed oil fatty acids, and 15.0 parts of Xylene to 334.8 parts of a commercially available cationic epoxy resin (PPG's resin ZN6EZ506) and 112.2 parts of a commercially available pigment (PPG's pigment ZN6EP594). Deionized water, 453 parts was then added to give a coating comnposition containing 21.1% solids. The cationic electrodeposition bath of pH 6.4 was electrodeposited upon a steel panel at 75° F. and 250 volts for 120 seconds to yield a smooth film which was cured at 375° F. for 20 minutes. The resultant smooth hard film of 3.6 mil thickness was void free and had a pencil hardness of 6H.

This e-coat bath contained 189.9 parts of solids and therefore contained 2.1% BWS of surfactant, 7.9% BWS of solvent, and 7.9% BWS of reactive viscosity modifier. EXAMPLE III A cationic electrophoretic coating composition was prepared by adding 5.50 parts of surfactant (polyethylene glycol 400 ester of linseed oil fatty acids described in Example I), 5.50 parts of viscosity modifier (isobutyl ester of linseed oil fatty acids described in Example I), and 5.50 parts of Xylene to 791.0 parts (16.4% nonvolatiles) of a commercially available cationic acrylic resin (PPG's POWERCRON PLUS 700). The coating composition of pH 5.5 contained 17.2% solids and was electrodeposited upon a steel panel at 80° F. and 125 volts for 90 seconds to yield a smooth film which was cured at 300° F. for 20 minutes. The smooth hard film of 3.5 mil thickness was partially void free and had a pencil hardness of 2H.

The e-coat bath contained 129.7 parts solids and therefore contained 4.2% BWS surfactant, 4.2% BWS reactive viscosity modifier and 4.2% BWS Xylene.

EXAMPLE IV

An anionic electrophoretic coating composition was prepared by adding 7.0 parts of a surfactant, Span 20 (ICI Americas Inc.), 7.0 parts of a viscosity modifier, methyl ester of linseed oil fatty acids (descirbed in Example II), and 7.0 parts of xylene to 250 parts of a commercially available anionic epoxy resin (PPG's resin JF3EZ445) and 566.0 parts of deionized water. The anionic electrodeposition bath of pH 7.5 and 10.9% solids was electrodeposited upon a steel panel at 75° F. and 100 volts for 120 seconds to yield a smooth film which was cured at 325° F. for 20 minutes. The resultant smooth hard film of 2.0 mil thickness was partially void free and had a pencil hardness of 2H.

The resulting e-coat bath had 87.9 parts solids and contained 8% BWS surfactant, 8% BWS reactive viscosity modifier and 8% BWS solvent.

EXAMPLE V

An anionic electropheretic coating composition was prepared by adding 7.0 parts of surfactant, polyethylene glycol 400 ester of linseed oil fatty acids described in Exmaple I, 7.0 parts of viscosity modifier, isobutyl ester of linseed oil fatty acids described in Example I, and 7.0 parts of xylene to 182.0 parts of a commercially available anionic epoxy resin (PPG's resin JF3EZ445). Deionized water, 578.0 parts, was then added to give a coating composition containing 11.10% solids. The coating composition of pH 7.6 was electrodeposited upon a steel panel at 75° F. and 100 volts for 120 seconds to give a smooth film which was cured at 325° F. for 20 minutes. The resultant smooth hard film of 1.5 mil thickness was not void free and had a pencil hardness of 6H.

The resulting e-coat bath of 90.6 parts total solids contained 7.7% BWS surfactant, 7.7% BWS reactive viscosity modifier and 7.7% BWS solvent.

EXAMPLE VI

A viscosity modifier, n-octyl ester of linseed oil fatty acids, was prepared by heating 278.1 parts of linseed oil fatty acids (Proctor and Gamble's L-310), 143.0 parts of 1-octanol (Aldrich Chemical Co.) and 0.25 parts of para-toluenesulfonic acid to reflux under an atmosphere of nitrogen. The reactants were heated and stirred until the theoretical amount of water was distilled off. Excess 1-octanol was then removed by distillation to yield the product ester which had an acid number of 3.12 and an iodine number of 129.

An anionic electrophoretic coating composition was prepared by adding 5.0 parts of surfactant, polyethylene glycol 200 ester of linseed oil fatty acids described in Example II, 5.0 parts of the viscosity modifier described above, and 5.0 parts of xylene to 81.0 parts of a commercially available anionic acrylic resin (JAPCO W359, Jamestown Paint Co.). Deionized water, 700.0 parts, was then added to yield a coating composition containing 8.14% solids. The anionic electrodeposition bath of pH 8.0 was electrodeposited at 75° F. and 100 volts for 120 seconds to give a smooth film which was cured at 350° F. for 15 minutes. The resultant smooth hard film of 3.4 mil thickness was not void free and had a pencil hardness of H.

The resulting e-coat bath of 57 parts total solids contained 8.8% BWS surfactant, 8.8% BWS reactive viscosity modifier and 8.8% BWS solvent.

EXAMPLE VII

An anionic electrophoretic coating composition was prepared by adding 5.0 parts of surfactant, polyethylene glycol 200 ester of linseed oil fatty acids described in Example II, 5.0 parts of viscosity modifier, 1-octyl ester of linseed oil fatty acids described in Example VI, and 5.0 parts of mineral spirits to 80.0 parts of a commercial available anionic polyester resin (Kelso 2080, Spencer Kellogg Co.). Deionized water, 700.0 parts, was then added to give a coating composition containing 8.62% solids. The anionic electrodeposition bath of pH 7.5 was electrodeposited upon a steel panel at 75° F. and 100 volts for 120 seconds to give a smooth film which was cured at 350° F. for 15 minutes. The resultant smooth hard film of 2.8 mil thickness was not void free and had a pencil hardness of 6H.

The resulting bath composition of 67 parts total solids contained 7.5% surfactant, 7.5% reactive viscosity modifier and 7.5% solvent.

EXAMPLE VIII

A cationic electrophoretic coating composition was prepared by adding a preblend of 4.0 parts surfactant, polyethylene glycol 200 ester of linseed oil fatty acids described in Exmaple II, 15.0 parts of viscosity modifier, methyl ester of linseed oil fatty acids described in Example II, and 15.0 parts of xylene to 335.0 parts of a commercially available cationic epoxy resin (PPG's resin ZN6EZ506), 100.8 parts of a pigment (PPG's pigment ZN6EP505), and 393.8 parts of deionized water. The cationic electrodeposition bath of pH 6.4 contained 21.2% solids and was electrodeposited at 75° F. and 250 volts for 120 seconds to give a smooth film which was cured at 375° F. for 20 minutes. The resultant smooth hard film of 3.0 mil thickness was partially void free and had a pencil hardness of 6H.

The resulting e-coat bath had 175.9 parts solids and contained 2.3% BWS surfactant, 8.5% BWS reactive viscosity modifier and 8.5% BWS solvent.

EXAMPLE IX

A cationic electrophoretic coating composition was prepared by adding a preblend of 4.0 parts surfactant, polythylene glycol 400 ester of linseed oil fatty acids, described in Example II, 15.0 parts of viscosity modifier isobutyl ester of linseed oil fatty acids described in Example I, 0.10 parts of a commercially available paint drier (6% Cobalt NAP-ALL, Mooney Chemicals, Inc.), 0.10 parts of a drier accelerator (Active-8, R. T. Vanderbilt Co.), and 15.0 parts of xylene to 334.8 parts of a cationic epoxy resin, PPG's ZN6EZ506 and 112.2 parts of a commercially available pigment (PPG's pigment ZN6EP594), and 453.0 parts of deionized water. The cationic electrodeposition bath of pH 6.3 contained 20.9% solids and was electrodeposited upon a steel panel at 75° F. and 250 voltls to give a smooth film which was cured at 375° F. for 20 minutes. The resultant smooth hard film of 3.4 mil thickness was void free and had a pencil hardness of 6H.

The resulting e-coat bath had 188.1 parts solids and contained 2.1% BWS surfactant, 8% BWS reactive viscosity modifier and 8% BWS solvent.

EXAMPLE X

A cationic electrophoretic coating composition was prepared by adding a preblend of 2.0 parts surfactant polyethylene glycol 200 ester of linseed oil faty acids described in Example II, 2.0 parts surfactant polyethylene glycol 400 ester of linseed oil fatty acids, 7.5 parts of viscosity modifier isobutyl ester of linseed oil fatty acids described in Example I, 7.5 parts of viscosity modifier methyl ester of linseed oil fatty acids described in Example II, 15.0 parts of xylene, and 0.20 parts of a commercially available paint drier (6% Cobalt NAP-ALL, Mooney Chemicals, Inc.) to 334.8 parts of a commercially available cationic epoxy resin (PPG's ZNGEZ506) and 100.8 parts of a commercially available pigment (PPG's ZNGEP505). Deionized water, 393.8 parts, was added to give a coating composition containing 21.2% solids. The cationic electrodeposition bath of pH 6.5 was electrodeposited upon a steel panel at 75° F. and 250 volts for 120 seconds to yield a smooth film which was cured at 375° F. for 20 minutes. The resultant smooth hard film of 2.9 mil thickness was not void free and had a pencil hardness of 6H.

The resulting e-coat bath had 175.8 parts solids, and contained 2.3% BWS surfactant (combined); 8.5% BWS reactive viscosity modifier (combined) and 8.5% BWS solvent.

EXAMPLE XI

An e-coat bath could be prepared by mixing about 334.8 parts of a cationic epoxy resin such as sold by PPG under the trade designation ZN6EZ506, with 112.2 parts by weight of a pigment such as that sold by PPG under the trade designation ZN6EP594, together with about 453 parts by weight of deionized water. The resulting bath would be expected to have a solid content of approximately 21% or about 190 parts by weight.

The resulting e-coat bath could have additives admixed to it and for example 4.75 part by weight of the surfactant described in Example I, about 19 parts by weight of the reactive viscosity modifier described in Example II and about 19 parts by weight of xylene. This would result with a bath containing approximately 2.5% BWS of the nonionic surfactant, about 10% BWS of the reactive viscosity modifier, and about 10% BWS of the water emissable solvent. The resulting bath with the additive components would be expected to yield a smooth hard film with increased thickness.

EXAMPLE XII

An e-coat bath could be formed by mixing about 335 parts of the commercially available cationic resin such as ZN6EZ506 sold by PPG, about 453 parts deionized water, 0.1 part of a cobalt paint drier such as 6% Cobalt NAP-ALL sold by Mooney Chemicals, land 0.1 parts of a drier accelerator such as Active-8, sold by R. T. Vanderbilt Co., 112 parts of a pigment such as PPG's ZN6EP594. The resulting bath would be expected to have a solids content of about 21% or 188 parts solids. Any additive components could be made as explained in Example II. To such a bath could be added about 3.8 parts of the surfactant described in the Example I, 11.4 parts of the reactive viscosity modifier described in Example II and 11.4 parts of xylene. This would yield a e-coat bath containing the additive components in the amount of approximately 2% BWS surfactant, 6.0% BWS reactive viscosity modifier and 6.0% BWS solvent.

EXAMPLE XIII

A additive composition could be preblended by adding about 5. parts of the methyl ester of linseed oil fatty acids described in Example II as the reactive viscosity modifier to about 5. parts of the surfactant, polyethylene glycol 200 ester of linseed oil fatty acids, described in Example II and then adding about 10.0 parts of xylene to form an additive admixture.

An e-coat bath can be formed utilizing about 335 parts of a commercially available cationic epoxy resin (such as PPG'S resin ZN6EZ506), 112.8 parts of pigment (such as PPG's pigment ZN6EP505), and about 393.8 parts of deionized water to yield an e-coat bath containing about 21% solids. To this e-coat bath could then be added the 20.00 parts of additive admixture which would result in an e-coat bath containing about 2.78% BWS surfactant, 2.78% BWS reactive viscosity modifier and about 5.55% BWS solvent.

EXAMPLE XIV

A preblended added composition in accord with the present invention could be formulated by the mixing of equal parts of surfactant, reactive viscosity modifier, and solvent described in Example IX. One of the advantages of utilizing the additive composition which is preblended to a predetermined ratio of the components is that it allows for that ratio to be maintained but permits varying the level at which the components are added as a percentage of the solids simply by adjusting the amount of the additive admixture used. For example, a bath could be made by mixing 334.8 parts by weight of a cationic epoxy resin such as that sold by PPG under the trade designation ZN6EZ506, 112.2 parts by weight of a pigment such as sold by PPG ZN6EP594 and 453 parts by weight of deionized water. This would produce a bath with approximately 21% solids or approximately 190 parts of solids.

Thus by adding various amounts of the preblended additive in the mixture, one can vary the percent by weight those additives represent while still maintaining the same ratio between the additive components. For example, one could add 11.4 parts by weight of the additive composition which would result in a bath having approximately 2.0% BWS surfactant, 2.0% BWS reactive viscosity modifier and 2.0% BWS solvent. If 57 parts by weight of the blend were added it would produce a bath having 10% BWS surfactant, 10% BWS reactive viscosity modifier and 10% solvent. If approximately 85.5 parts by weight of the preblended composition were added to the bath it would result in a bath having about 15% BWS surfactant, 15% BWS reactive viscosity modifier, and 15% BWS solvent.

EXAMPLE XV

In another example of the invention, an e-coat bath without the additives formulation could be made as described in Example XI.

To that e-coat bath composition could be added the following additive components, about 14.25 parts by weight of the surfactant described in Example I, and 28.5 parts by weight of the methyl ester reactive viscosity modifier described in Example II, and 28.5 parts by weight of mineral spirits. This would produce an e-coat bath having about 7.5% BWS surfactant, about 15% BWS reactive viscosity modifier, and about 15% BWS solvent. Such a bath would be expected to produce a film with increased thickness and good film characteristics.

While this invention has been described in relation to its preferred embodiments, it is to be understood that various modifications thereof will be apparent to those of ordinary skill in the art upon reading the specification and it is intended to cover all such modifications as fall within the scope of the appended claims.

I claim:

1. In an electrophoretic deposition system, an additive composition in combination with charged solubilized organic resins in aqueous solutions which are suitable for electrophoretic application to conductive substrates said composition consisting essentially of:
   (a) from 3 to 83% of a nonionic surfactant compatible with an electrocoating bath,
   (b) from 3 to 83% of a an ethylenically unsaturated ester reactive viscosity modifier, said reactive viscosity modifier being compatible with an electrocoating bath, and
   (c) from 3 to 83% of a solvent having a solubility parameter of from about 6.9 to about 10.

2. The composition of claim 1 in which the solvent has a boiling point of about 200° F. to about 300° F.

3. The composition of claim 1, in which said surfactant has an HLB value of less than about 14.

4. The composition of claim 3, in which the surfactant is selected from a group consisting of ethoxylated aliphatic esters, ethoxylated aliphatic amines, ethoxylated aliphatic ethers, ethoxylated aromatic ethers, and combinations thereof.

5. The composition of claim 4 in which the ethoxylated aliphatic ester is a polyethylene glycol ester of an unsaturated fatty acid.

6. The composition of claim 5 in which said ester is polyethylene glycol with a molecular weight from about 200 to about 600.

7. The composition of claim 6 in which said ester is polyethylene glycol with a molecular weight from about 200 to about 400.

8. The composition of claim 4 in which the ethoxylated ether is a polyoxyethylenated tertoctylphenol or a block copolymer of propylene oxide and ethylene oxide.

9. The composition of claim 1 wherein said surfactant is in a range of from 14 to 72%, said reactive viscosity modifier is present in an amount form about 14 to 72% and said solvent is present in an amount from about 14 to 72%.

10. The composition of claim 1 in which the reactive viscosity modifier is the ester of a hydrocarbon moeity having up to eight carbon atoms and an unsaturated fatty acid.

11. The composition of claim 10 in which the unsaturated fatty acid is selected from a group consisting essentially of oleic, linoleic or linolenic acid.

12. The composition of claim 11 in which the hydrocarbon moiety is methyl.

13. The composition of claim 11 in which the hydrocarbon moiety is isobutyl.

14. The composition of claim 11 in which the hydrocarbon moiety is octyl.

15. The composition of claim 2 wherein the surfactant is a nonionic compatible surfactant, the reactive viscosity modifier is an ethylenically unsaturated ester of a hydrocarbon moiety up to eight carbon atoms and an unsaturated fatty acid, and the ratio of said surfactant to said reactive viscosity modifier to said solvent is between about 1:0.75:0.75 and about 1:5:6.

16. The composition of claim 15 wherein said surfactant is present in an amount from about 14 to 72%, said reactive viscosity modifier is present in an amount from about 14 to 72% and said solvent is present in an amount from about 14 to about 72%.

17. In an electrophoretic deposition system, an additive composition in combination with charged solubilized organic resins and aqueous solutions which are suitable for electrophoretic application to conductive substrates, said composition consisting essentially of
   (a) from 8 to 40% of a nonionic surfactant compatible with an electrocoating bath,
   (b) from 22 to 62% of a reactive viscosity modifier, said an ethylenically unsaturated ester reactive viscosity modifier being compatible with an electrocoating bath system,
   (c) from 22 to 62% of a solvent having a solubility parameter of from about 6.9 to about 10.

18. The composition of claim 17 wherein said surfactant is a nonionic surfactant having an HLB number in the range of from 6 to 14, and is capable of cross-linking by auto-oxidation to the reactive viscosity modifier.

19. The composition of claim 17 wherein said reactive viscosity modifier is curable by auto-oxidation and capable of cross-linking with said surfactant or the resin or both.

20. The composition of claim 18 wherein said reactive viscosity modifier is an ethylenically unsaturated ester derived from a fatty acid or alcohol or mixtures of fatty acids or alcohols of the general formulas:

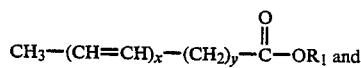 and

-continued
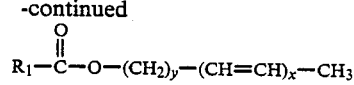

wherein x is 1, 2, or 3; y is 1 to 20; $R_1$ is hydrogen alkyl of up to about 20 carbon atoms, or an aryl.

21. The composition of claim 20 wherein $R_1$ contains 8 or less carbon atoms.

22. The composition of claim 17 wherein said reactive viscosity modifier is the methyl ester of linolenic acid and the surfactant is the reaction product of linseed oil fatty acids and polyethylene glycol with an average molecular weight from about 200 to about 600.

23. The composition of claim 22 wherein said reactive viscosity modifier is the methyl ester of linolenic acid and the surfactant is the reaction product of linseed oil fatty acids and polyethylene glycol with an average molecular weight from about 200 to about 400.

24. The composition of claim 19 wherein said reactive viscosity modifier is an ethylenically unsaturated ester derived from a fatty acid or alcohol or mixtures of fatty acids or alcohols of the general formulas:

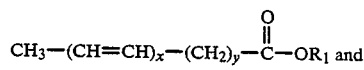 and

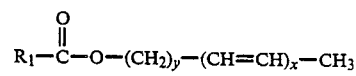

wherein x is 1, 2, or 3; y is 1 to 20; $R_1$ is hydrogen alkyl of up to about 20 carbon atoms, or an aryl.

25. The composition of claim 23 wherein $R_1$ contains 8 or less carbon atoms.

26. The composition of claim 17 wherein the ratio of surfactant to reactive viscosity modifier to solvent is between 1:0.75:0.75 and 1:5:6.

27. The composition of claim 19 wherein the ratio of surfactant to reactive viscosity modifier to solvent is between 1:0.75:9.75 and 1:5:6.

* * * * *

UNITED STATES PATENT AND TRADEMARK OFFICE
CERTIFICATE OF CORRECTION

PATENT NO. : 4,810,738

DATED : March 7, 1989

INVENTOR(S) : Caridi

It is certified that error appears in the above-identified patent and that said Letters Patent is hereby corrected as shown below:

Column 2, line 28, "preferrably" should read --preferably--;
Column 8, line 24, "preferrably" should read --preferably--;
Column 9, line 50, "preferrably" should read --preferably--;
         line 51, "preferrably" should read --preferably--;
Column 10, line 18, delete "was" and substitute therefor --were--;
Column 14, line 15, "ZNGEZ506" should read --ZN6EZ506--;
         line 16, "ZNGEP505" should read --ZN6EP505--;
         line 46, "emissable" should read --immiscible--;
         line 64, "a" should read --an--;
Column 15, line 3, "A" should read --An--; and
Column 16, line 17, delete "a" before the word "an".

Column 2, line 26, "autooxidation" should read --auto-oxidation--;
Column 4, line 48, "abolut" should read --about--;
Column 6, line 51, "From" should read --from--;
Column 7, line 7, "arfe" should read --are--;
         line 52, "Aleyl" should read --Oleyl--;

UNITED STATES PATENT AND TRADEMARK OFFICE
CERTIFICATE OF CORRECTION

PATENT NO. : 4,810,738

DATED : March 7, 1989

INVENTOR(S) : Caridi

It is certified that error appears in the above-identified patent and that said Letters Patent is hereby corrected as shown below:

Column 8, line 21, "naot" should read --not--;
Column 10, line 63, "S0.25" should read --0.25--;
Column 11, line 47, "comnposition" should read --composition--;
          line 57, "EXAMPLE III" should be deleted from the line and centered as a heading on the following line;
Column 12, line 30, "Exmaple" should read --Example--;
Column 13, line 31, "Exmaple" should read --Example--;
          line 62, "voltls" should read --volts--;
Column 14, line 55, "land" should read --and--; and
Column 16, line 29, "allphatic" should read --aliphatic--.

Signed and Sealed this

Twelfth Day of December, 1989

Attest:

JEFFREY M. SAMUELS

Attesting Officer      Acting Commissioner of Patents and Trademarks